United States Patent [19]

Krupke et al.

[11] Patent Number: 5,105,434
[45] Date of Patent: Apr. 14, 1992

[54] ALGAAS DIODE PUMPED TUNABLE CHROMIUM LASERS

[75] Inventors: William F. Krupke, Pleasanton; Stephen A. Payne, Castro Valley, both of Calif.

[73] Assignee: The United States of America as represented by the United States Department of Energy, Washington, D.C.

[21] Appl. No.: 698,038

[22] Filed: May 10, 1991

[51] Int. Cl.$^5$ .............................................. H01S 3/14
[52] U.S. Cl. ........................................ 372/69; 372/41; 372/70; 372/75; 372/20
[58] Field of Search .................. 372/69, 70, 75, 20, 372/41

[56] References Cited

U.S. PATENT DOCUMENTS 4,811,349 3/1989 Payne et al. ..................... 372/41

Primary Examiner—Léon Scott, Jr.
Attorney, Agent, or Firm—L. E. Carnahan; Roger S. Gaither; William R. Moser

[57] ABSTRACT

An all-solid-state laser system is disclosed wherein the laser is pumped in the longwave wing of the pump absorption band. By utilizing a laser material that will accept unusually high dopant concentrations without deleterious effects on the crystal lattice one is able to compensate for the decreased cross section in the wing of the absorption band, and the number of pump sources which can be used with such a material increases correspondingly. In a particular embodiment a chromium doped colquiriite-structure crystal such as $Cr:LiSrAlF_6$ is the laser material. The invention avoids the problems associated with using AlGaInP diodes by doping the $Cr:LiSrAlF_6$ heavily to enable efficient pumping in the longwave wing of the absorption band with more practical AlGaAs diodes.

15 Claims, 3 Drawing Sheets

ALGAAS DIODE PUMPED TUNABLE CHROMIUM LASERS

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

The present invention relates to solid state lasers, and more particularly, to chromium doped solid state lasers.

Several types of crystals have been doped with chromium for use as lasers. Alexandrite ($Cr^{3+}:BeAl_2O_4$) is perhaps the most established of these. More recently, colquiriite-structure crystals (named after the tin mining region in Bolivia where the crystal structure was discovered) have been doped with chromium to produce laser materials that emit in the nearinfrared and have many desirable properties. Two such materials are $Cr^{3+}:LiSrAlF_6$ (Cr:LiSAF) and $Cr^{3+}:LiCaAlF_6$ (Cr:LiCAF). Both are disclosed in U.S. Pat. No. 4,811,349, issued Mar. 7, 1989 to Payne et al. When utilized as lasers, these fluorides have very low thermal lensing in comparison with oxides such as alexandrite, as well as a reduced tendency to solarize under UV light. They also provide good beam quality at sizable average power levels. Since Cr-doped lasers in general have the highest flashlamp-pump absorption efficiencies, Cr-doped fluorides such as Cr:LiCAF and Cr:LiSAF are excellent choices for tunable laser applications in the nearinfrared spectrum. They may also be frequency doubled to the blue-green region.

Although similar, the absorption and emission spectra of Cr:LiSAF are broader and shifted to longer wavelengths than Cr:LiCAF, and the absorption and emission cross-sections are larger by about a factor of four, making Cr:LiSAF the preferred crystal for many applications.

Currently, there exists a strong need for an all-solid state, tunable laser system in the near infared spectral region: as a commerical instrument replacing liquid dye lasers and titanium sapphire (TIS) lasers pumped with argon ion lasers or with frequency-doubled diode-pumped Nd-lasers; as a diagnostic source for industrial applications; as a source for isotope separation applications; as a source to be harmonically doubled into the blue-green spectral region; as a source for medical diagnostic and surgical applications. The commercially available sources mentioned above are inefficient, and, therefore, demend excessively high amounts of electrical input power and water cooling; this limits or precludes widespread use of dye and/or TIS lasers, particularly in applications requiring portability.

The "ideal" source might consist of a chromium-doped crystal laser pumped by a semiconductor laser. The principal problem to data has been determining a practical and cost-effective technical match between a powerful, and efficient semiconductor laser pump source and a chromium doped low-field crystal.

Toward this end, most recent effort in the laser R & D community has been centered on using a "red" 630-680 nm pump diode of the AlGaInP quaternary material system which is well matched to the peak of the lowest lying pump band (640 nm) of the preferred chromium crystal, Cr:LiSAF. The use of a mature, efficient, and powerful pump diode from the AlGaAs ternary material system, which emits in the 740-880 nm spectral region, has been completely ignored by the laser community, because of the perception that such a diode cannot be used to effectively pump Cr:LiSAF.

SUMMARY OF THE INVENTION

It is an object of the present invention to provide an all-solid-state laser system in which the laser crystal is pumped with a diode operating in the longwave wing of the laser crystal's absorption band. It is a further object of the present invention to provide a solid-state laser system in which the laser crystal is pumped in the longwave wing of the absorption band.

It is still a further object of the present invention to provide a solid-state laser system in which the laser crystal is chromium doped, and the diode pump is AlGaAs, (or a related semiconductor in which an additional impurity such as In is included to enhance the diode reliability).

These and other objects of the invention are realized by using for the laser material a crystal of $LiSrAlF_6$ (LiSAF) that has been uniformly doped with chromium to a higher level than previously thought possible, without destroying the crystal's utility as a laser material. By utilizing this higher level of doping, it is possible to efficiently pump the Cr:LiSAF in the longwave wing of the absorption band with an AlGaAs diode array operating in the 740-790 nm region. The Cr:LiSAF then emits in the near-infrared (780-1010 nm) region.

Although AlGaInP diodes operate around 650 nm, which is a close match to the peak of the Cr:LiSAF absorption band, the advantages of AlGaAs more than offset this quality. For instance:

1. The operating efficiencies of AlGaAs diodes are 2-3 times those of AlGaInP diodes (which are limited by basic intrinsic phenomena).
2. AlGaAs diode arrays emitting well in excess of a hundred watts have been developed already; such high-power AlGaInP laser diode arrays have not yet been developed, nor are they likely to be developed in the next half decade since there is no significant market demand for them.
3. Because of the above mentioned facts, the unit cost of AlGaInP laser diode arrays is more than 100 times that of AlGaAs laser diode arrays. For the foreseeable future, therefore, only AlGaAs pumped Cr:LiSAF lasers are likely to be cost effective, particularly for such lasers producing output powers in excess of several hundred milliwatts. This cost differential will enable the cost-effective introduction and proliferation of diode pumped chromium tunable lasers in a wide variety of scientific, industrial, and commercial applications.

Thus, in taking advantage of the ability to substitute chromium ions into the LiSAF crystal (replacing the aluminum) to approximately 5-100 atomic (at.) percent without significant deleterious effects on crystal quality or on spectroscopic/laser parameters, one is advantageously able to use AlGaAs diodes as a pump for Cr:LiSAF. Such a solid-state laser system addresses applications that have gone unengaged until now due to the lack of an efficient solid-state near-infrared tunable laser system.

DETAILED DESCRIPTION OF THE INVENTION

Figure 1A:
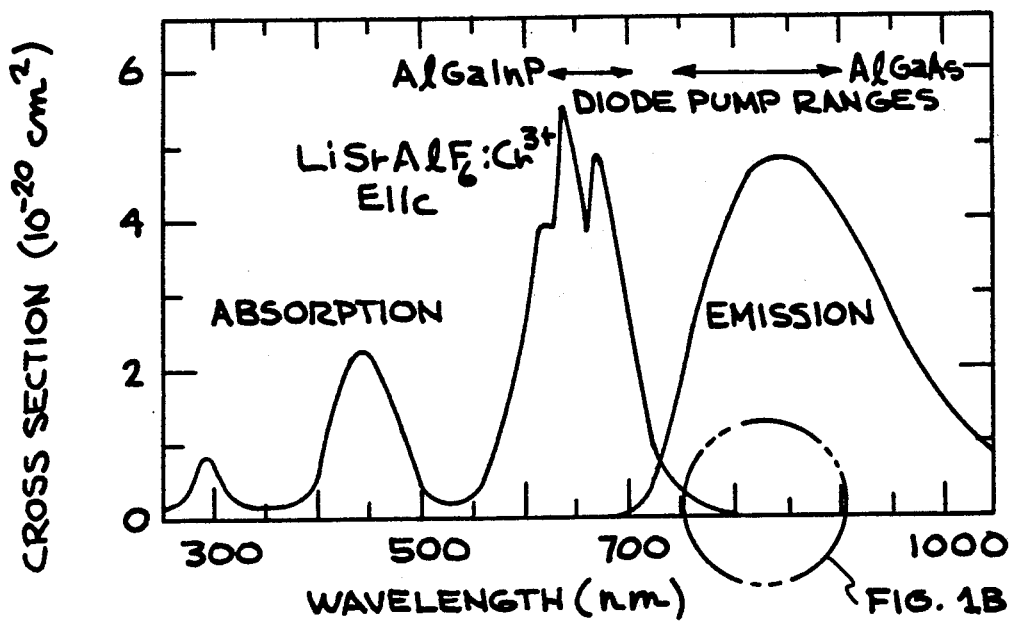
FIG. 1 shows the variation of the absorption and emission cross sections of Cr:LiSAF with wavelength.
Figure 1B:
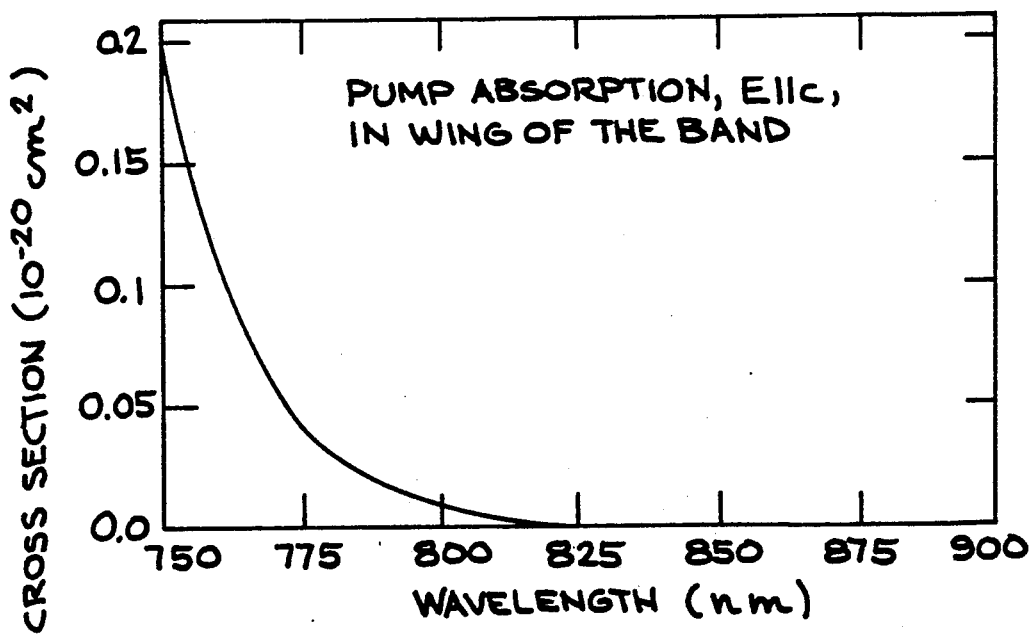

When Cr:liSAF was discovered several years ago it was found to lase efficiently and to exhibit a tuning range from 780 to 1010 nm. FIG. 1 shows the absorption and emission spectra of Cr:LiSAF, with an expanded view of the longwave wing of the 640 nm pump band shown in the lower half of the figure. On the basis of the measured emission cross section spectrum and the principle or reciprocity it was determined that the absorption taking place around 750 nm is indeed useful absorption in the longwave wing of the 640 nm pump band (i.e. the absorption does not arise from unwanted defects or disturbed $Cr^{3+}$ centers). It is calculated that a Cr-doping of $9.5 \times 10^{20}$ cm$^{-3}$ (11 at. %) provides an absorptive e-folding in a 0.5 cm pathlength at 750 nm. With a 770 nm pump source 38 at. % Cr is needed to provide an e-folding. In accordance with the present invention it was found that LiSAF can be Cr-doped to this level and higher, up to 100 at. %, while retaining its favorable laser and optical properties. The ability to use such high doping levels enables one to efficiently utilize AlGaAs diodes as a pump source to form a practical all-solid-state LiSAF laser that is pumped in the longwave wing of the pump band.

Figure 2:
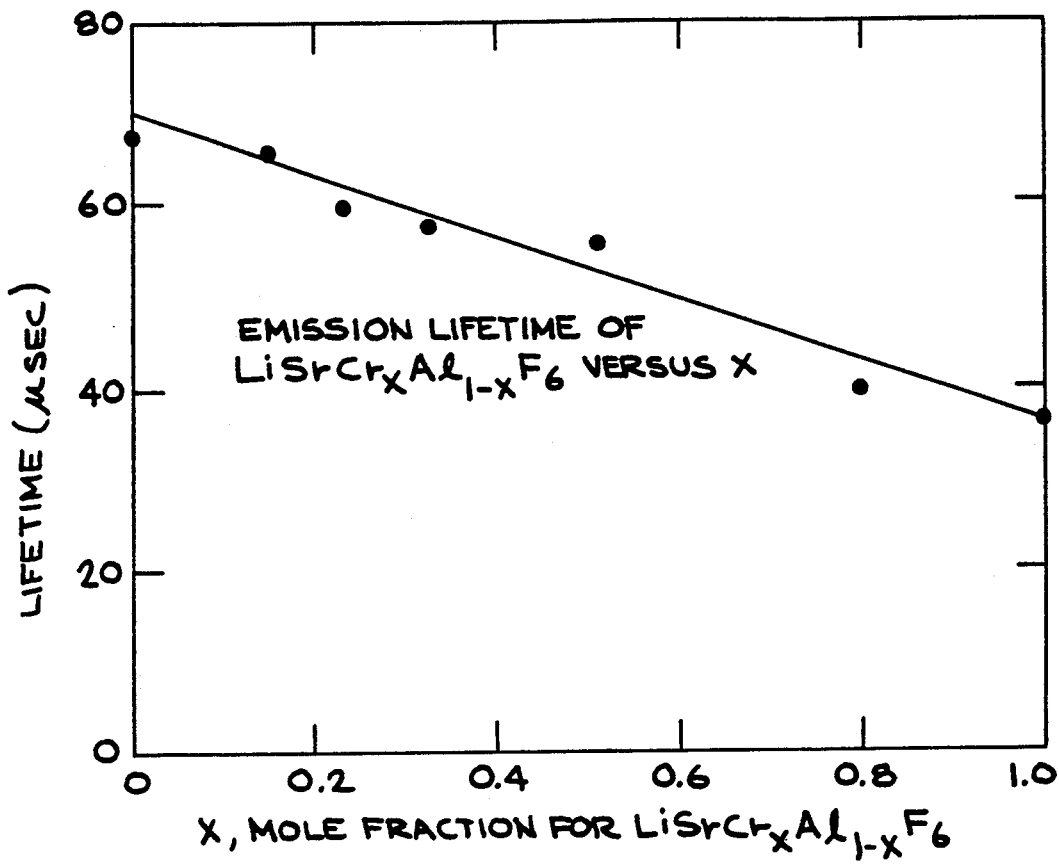
FIG. 2 shows the emission lifetime of Cr:LiSAF as a function of the chromium doping level.

The measured room temperature emission lifetime of Cr:LiSAF is plotted as a function of the $Cr^{3+}$ atomic fraction in FIG. 2. The decay times are exponential at all concentrations. Also, for a given concentration, the lifetime value is the same for excitation at 670, 750, and 780 nm, indicating that only a single type of $Cr^{3+}$ ion is present in the lattice. Advantageously, the emission lifetime does not decrease unduly when the doping level is increased to the level needed for pumping in the longwave wing. The lifetime of the stoichiometric crystal LiSrCrF$_6$ is quenched by less than a factor of two compared with the lifetime of lightly doped LiSAF. (This anomalously slow quenching rate of Cr:LiSAF also opens the possibility of constructing "micro" lasers pumped near the peak of the pump band, 640 nm.) Thus, Cr;LiSAF is a good laser material at all doping levels, and is suitable for pumping in the longwave wing.

Figure 3:
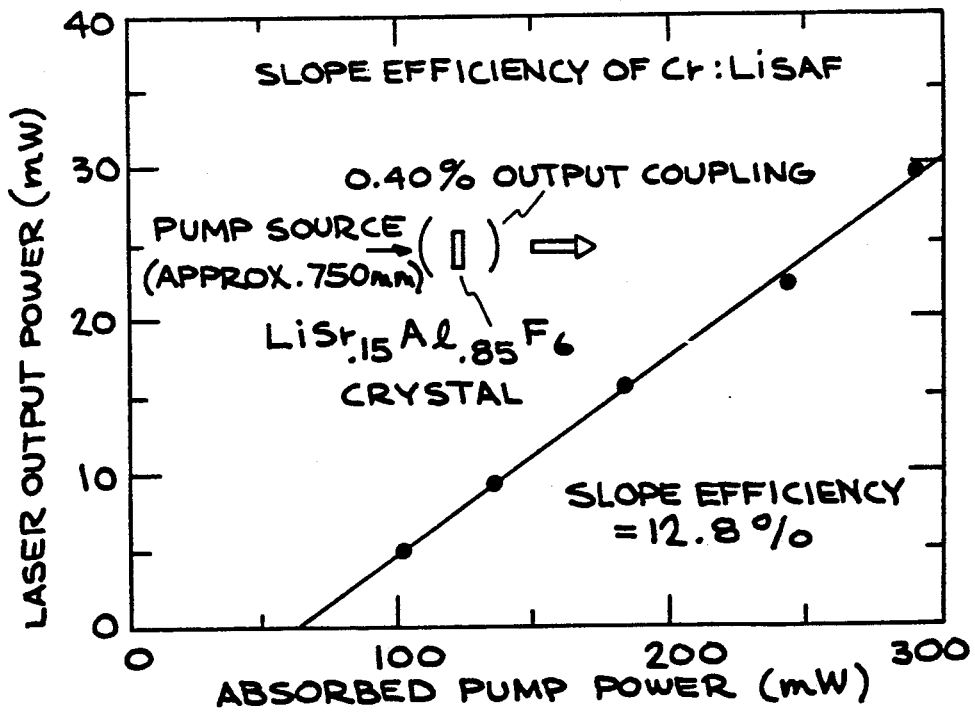
FIG. 3 shows the Cr:LiSAF laser output power as a function of absorbed pump power when pumped in the longwave wing of the absorption band.

FIG. 3 contains the laser efficiency data obtained for a LiSrCr$_{.15}$Al$_{.85}$F$_6$ crystal pumped at approximately 750 nm with a 2% duty cycle. The low pump power used in this experiment requires a low output coupling of 0.40% in order to reach threshold. This low output coupling emphasizes the detrimental effect of passive loss in the cavity. Relaxation oscillation measurements indicate a single-pass passive loss of 0.61%. Separate absorption experiments indicate that this loss is attributable to the sample, which exhibits 0.3% scattering loss and 0.30% absorption loss at the lasing wavelength. By accounting for the passive losses, the measured slope efficiency of 12.8% is corrected to an intrinsic efficiency of 39% (in the total absence of passive loss). This value approaches the intrinsic efficiency of 52% previously obtained for a lightly-doped Cr:LiSAF sample that was pumped at 647 nm. This data indicates that highly-doped Cr:LiSAF pumped in the longwave wing of the absorption band (with AlGaAs) performs similarly to lightly-doped Cr:LiSAF pumped in the peak of the absorption band (with the substantially less well developed AlGaInP).

It is important to note that AlGaInP "red" diode lasers have previously been used to pump Cr:LiSAF near the peak of the absorption band. While the wavelength match with the peak of the Cr:LiSAF absorption band is excellent for this diode, the power, cost, and reliability of AlGaInP diodes is now, and is expected to remain, inferior to that of AlGaAs diodes. Since the AlGaAs diode laser output occurs in the longwave wing of the Cr:liSAF absorption band, the Cr dopant must be increased significantly to compensate for weaker absorption. It is nevertheless preferable to pump Cr:LiSAF with the superior AlGaAs diode lasers, because the inventors have found that the optical and laser properties of Cr:LiSAF do not degrade at high Cr-doping levels.

Figure 4:
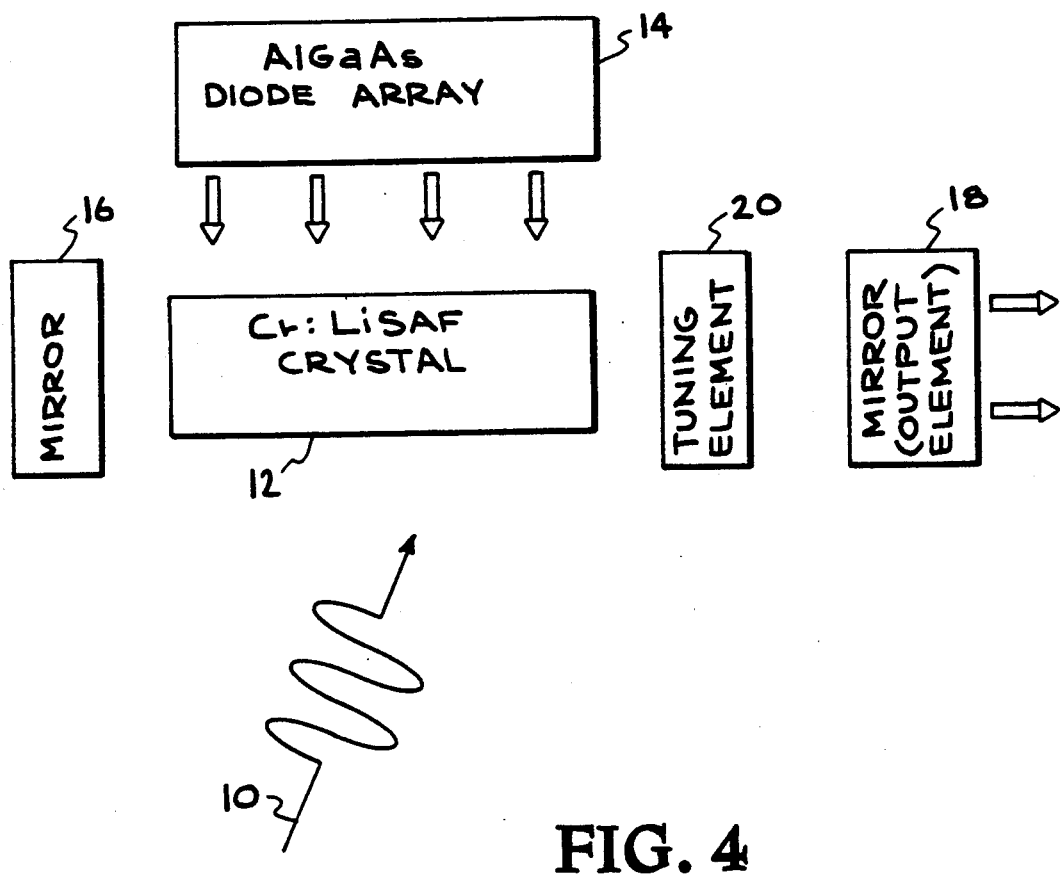
FIG. 4 is a schematic diagram of an all-solid-state AlGaAs diode pumped Cr:LiSAF laser.

A schematic diagram of an all-solid-state laser system according to the present invention is shown in FIG. 4. Laser system 10 includes crystal 12 that is preferably Cr: LiSAF doped highly enough (between 5 and 100 at. %) to allow efficient pumping in the longwave wing of the absorption band (740–790 nm). Pump 14 is preferably an AlGaAs diode array with a power output of several watts or more, although any other laser emitting enough power in the same portion of the absorption band will work also. For instance, a krypton laser can be used to pump crystal 12. Crystal 12 is placed between mirrors 16 and 18, or some other cavity means to form a resonator. Mirror 18 is partly transmitting to the laser wavelength to provide the output coupling or energy extraction means, while mirror 16 is highly reflective. A tuning element 20 such as a filter may be placed in the cavity to select or limit the range of laser wavelengths. (A301 in FIG. 4, axial pumping may also be utilized.)

The heavily doped Cr:LiSAF crystal may be grown essentially the same way the more lightly doped Cr:LiSAF crystal has been grown in the past, but with more chromium and less aluminum in the initial mixture. Specifically, the starting materials are optical grade LiF and SrF$_2$, sublimed AlF$_3$, and anhydrous pure CrF$_3$. The crystal may then prepared with the horizontal zone melting technique. The mixture, containing the desired proportions of AlF$_3$ and CrF$_3$, is first hydrofluorinated in a Pt boat at 770° C. for 8 hours. After being prepared in the Pt boat the charge is placed in an rfheated Pt tube furnace, heated to 760° C. with a low argon flow, and zone melted at a rate of 2 mm/hour. A boule prepared by this method yields good quality single crystals with a uniform distribution of $Cr^{3+}$. Alternatively, Cr:LiSAF can be grown by the Czochralski or Bridgman methods.

Another material, LiSrGaF$_6$ (LiSGAF), appears to have superior thermomechanical properties, while having spectroscopic properties akin to LiSAF. Since the crystalline structures are very similar, LiSGAF also appears likely to accept the high doping levels necessary to form a laser material (Cr:LiSGAF) that may be pumped with AlGaAs diodes.

The AlGaAs diode pump may further include a suitable stabilizing impurity, e.g. indium, in small amounts, typically less than five percent.

The scope of the present invention is not intended to be limited to a laser material such as Cr:LiSAF, and a pump material such as AlGaAs, but rather includes any laser crystal with a lattice that can be doped to a high enough level to allow pumping in the wings of the absorption band. All laser materials that retain their utility with doping levels that allow pumping in the wings of their absorption band, as well as systems combining these materials with suitable pump sources, are also intended to fall within the scope of the present invention.

We claim:

1. A laser system comprising a laser crystal and a laser pump to pump said crystal wherein:

said laser crystal is doped with impurities that give rise to an absorption band spanning a bounded continuous set of wavelengths such that when incident monochromatic radiation within said set of wavelengths is absorbed by said crystal it emits coherent radiation defining an emission band;

said absorption band is characterized by a peak absorption cross section at a first wavelength which decreases if the wavelength of incident monochromatic radiation deviates from said first wavelength, and approaches zero if the wavelength of incident monochromatic radiation approaches the bounds of said absorption band;

said laser pump is essentially monochromatic at a second wavelength within said absorption band; and said second wavelength is removed from said first wavelength towards the bounds of said absorption band such that the absorption cross section at said second wavelength is at least an order of magnitude less than the cross section at said first wavelength.

2. The laser system of claim 1 wherein said impurities are chromium, and said second wavelength is longer than 740 nanometers.

3. The laser system of claim 2 wherein said laser crystal is $LiSrCr_xAl_{1-x}F_6$, with $0.05 < X \leq 1$, and said laser pump comprises an AlGaAs diode monochromatic light source with a wavelength in the range of 740-790 nanometers.

4. The laser system of claim 3 wherein said diode further comprises a crystal stabilizing impurity.

5. The laser system of claim 3 wherein the impurity is In.

6. The laser system of claim 5 wherein said laser crystal is a chromium doped colquiriite-structure crystal and wherein the level of chromium doping is more than 5 atomic percent.

7. The crystal of claim 6 wherein said chromium doped colquiriite crystal is $LiSrCr_xAl_{1-x}F_6$, or $LiSrCr_xGa_{1-x}F_6$, with $0.05 < X \leq 1$.

8. A laser system comprising a laser crystal and a laser pump to pump said crystal wherein:

said laser crystal is doped with impurities that give rise to an absorption band spanning a bounded continuous set of wavelengths such that when incident monochromatice radiation within said set of wavelengths is absorbed by said crystal it emits coherent radiation defining an emission band;

the level of impurities in said laser crystal is more than 5 atomic percent.

9. The laser system of claim 8 wherein said impurities are chromium.

10. The laser system of claim 9 wherein said laser crystal is $LiSrCr_xAl_{1-x}F_6$, with $0.05 < X \leq 1$.

11. The laser system of claim 10 wherein said absorption band is characterized by a peak absorption cross section at a first wavelength which decreases if the wavelength of incident monochromatic radiation deviates from said first wavelength, and approaches zero if the wavelength of incident monochromatic radiation approaches the bounds of said absorption band wherein:

said laser pump is essentially monochromatic at a second wavelength within said absorption band; and said second wavelength is removed from said first wavelength towards the bounds of said absorption band such that the absorption cross section at said second wavelength is at least an order of magnitude less than the cross section at said first wavelength.

12. The laser system of claim 11 wherein said second wavelength is longer than 740 nanometers.

13. The laser system of claim 12 wherein said laser pump comprises an AlGaAs diode monochromatic light source with a wavelength in the range of 740-790 nanometers.

14. The laser system of clain 13 wherein said diode further comprises a crystal stabilizing impurity.

15. The laser system of claim 14 wherein the impurity is In.

* * * * *